(12) United States Patent
Lee et al.

(10) Patent No.: US 10,704,681 B2
(45) Date of Patent: Jul. 7, 2020

(54) GEAR ACTUATOR FOR DOUBLE CLUTCH TRANSMISSION

(71) Applicant: Hyundai Dymos Incorporated, Seosan-si, Chungcheongnam-do (KR)

(72) Inventors: Man Bok Lee, Hwaseong-si (KR); Won Kim, Yongin-si (KR); Mi Ae Oh, Hwaseong-si (KR)

(73) Assignee: Hyundai Dymos Incorporated, Seosan-Si, Chungcheongnam-Do (KR)

( * ) Notice: Subject to any disclaimer, the term of this patent is extended or adjusted under 35 U.S.C. 154(b) by 222 days.

(21) Appl. No.: 15/651,292

(22) Filed: Jul. 17, 2017

(65) Prior Publication Data

US 2019/0017593 A1    Jan. 17, 2019

(30) Foreign Application Priority Data

Jul. 18, 2016    (KR) .......................... 10-2016-0090808

(51) Int. Cl.
*F16D 21/06* (2006.01)
*F16H 61/12* (2010.01)
*F16H 61/02* (2006.01)

(52) U.S. Cl.
CPC ......... *F16H 61/12* (2013.01); *F16H 61/0202* (2013.01); *F16D 21/06* (2013.01);
(Continued)

(58) Field of Classification Search
CPC .... F16H 61/12; F16H 61/0003; F16H 63/304; F16H 61/32; F16H 61/0006;
(Continued)

(56) References Cited

U.S. PATENT DOCUMENTS

| 2009/0205456 A1* | 8/2009 | Fujimoto | ................ F16H 61/32 |
| | | | 74/473.24 |
| 2010/0242657 A1* | 9/2010 | Shintani | ................ F16H 61/688 |
| | | | 74/473.24 |

(Continued)

FOREIGN PATENT DOCUMENTS

| CN | 1336292 A | 2/2002 |
| CN | 101985978 A | 3/2011 |

(Continued)

OTHER PUBLICATIONS

Chinese Office Action for corresponding Chinese Application No. 201710586523.2 dated Oct. 31, 2018.
KIPO Search Report from KR 10-2016-0090808 dated Dec. 26, 2017.

*Primary Examiner* — David J Hlavka
(74) *Attorney, Agent, or Firm* — Harness, Dickey & Pierce, P.L.C.

(57) ABSTRACT

Disclosed herein is a gear actuator for a double clutch transmission, which includes a power module (100), including odd and even-numbered stage select solenoids and shift motors, a controller directly connected to them, and select levers connected to select rods of the select solenoids, shift modules (200) for transmitting the rotational forces of the shift motors to a control shaft assembly (300), the control shaft assembly (300) for transmitting the operating force of the power module (100) to a shift lug, and a body housing (400) having the power module (100), the shift modules (200), and the control shaft assembly (300) installed therein. Accordingly, the gear actuator can have a more compact structure and be easily assembled by modularization.

18 Claims, 10 Drawing Sheets

(52) U.S. Cl.
CPC .............. *F16D 2500/1083* (2013.01); *F16H 2061/1228* (2013.01); *F16H 2061/1268* (2013.01)

(58) Field of Classification Search
CPC ........... F16H 61/0202; F16H 2063/025; F16H 2063/2061; F16H 2063/1228; F16H 2061/1268; F16D 2500/1083; F16D 21/06
See application file for complete search history.

(56) References Cited

U.S. PATENT DOCUMENTS

| | | | | |
|---|---|---|---|---|
| 2015/0184743 | A1* | 7/2015 | Eto ......................... | F16H 61/16 |
| | | | | 701/55 |
| 2016/0047468 | A1* | 2/2016 | Hummel ................. | F16H 61/28 |
| | | | | 74/473.12 |
| 2018/0017158 | A1* | 1/2018 | Lee ......................... | F16H 61/32 |

FOREIGN PATENT DOCUMENTS

| | | |
|---|---|---|
| CN | 205064824 U | 3/2016 |
| KR | 20110011251 A | 2/2011 |
| KR | 2014-0051502 A | 5/2014 |

\* cited by examiner

GEAR ACTUATOR FOR DOUBLE CLUTCH TRANSMISSION

CROSS-REFERENCE(S) TO RELATED APPLICATIONS

This application claims priority to Korean Patent Application No. 10-2016-0090808, filed on Jul. 18, 2016, the disclosure of which is incorporated herein by reference in its entirety.

BACKGROUND OF THE INVENTION

Field of the Invention

Exemplary embodiments of the present invention relate to a gear actuator for a double clutch transmission, and more particularly, to a gear actuator that performs select and shift operations in a double clutch transmission.

Description of the Related Art

A double clutch transmission (DCT) is a type of automated manual transmission (AMT) that enables gear shifting operations (select and shift operations) of a manual transmission to be automatically performed, and includes actuators for individual shifting operations of respective odd and even-numbered stage gears and controllers to control the operations of the actuators.

Figure 1:
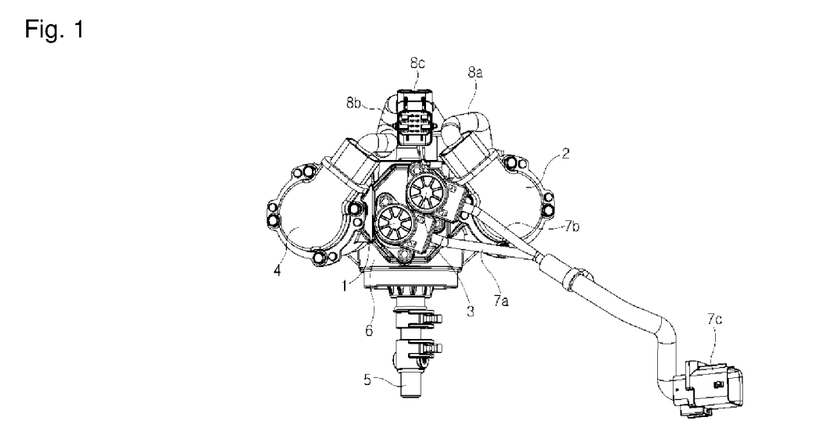
FIG. 1 is a back view illustrating a conventional gear actuator.
Figure 2:
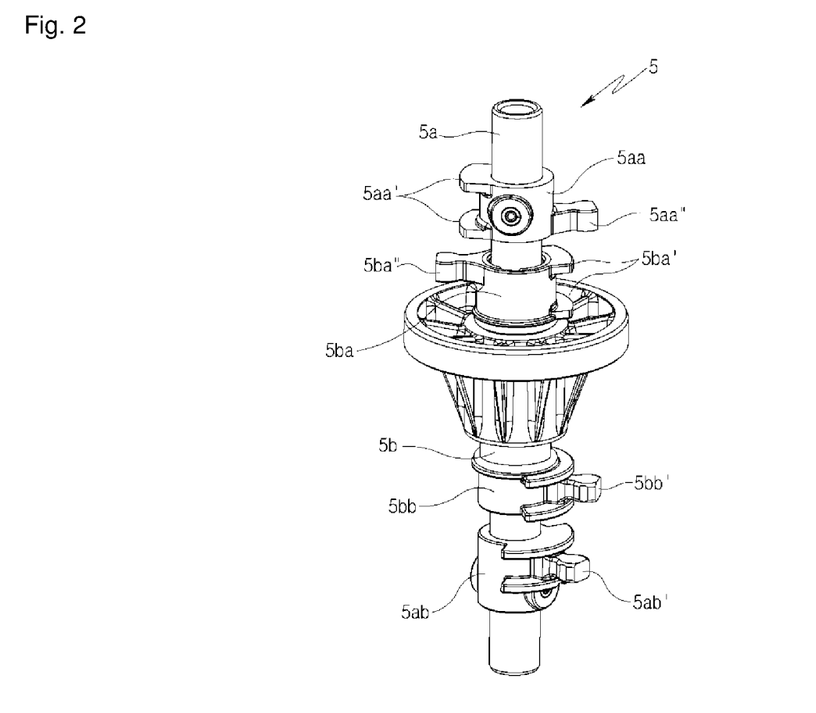
FIG. 2 is a perspective view illustrating a control shaft assembly as one component of the conventional gear actuator.
Figure 3:
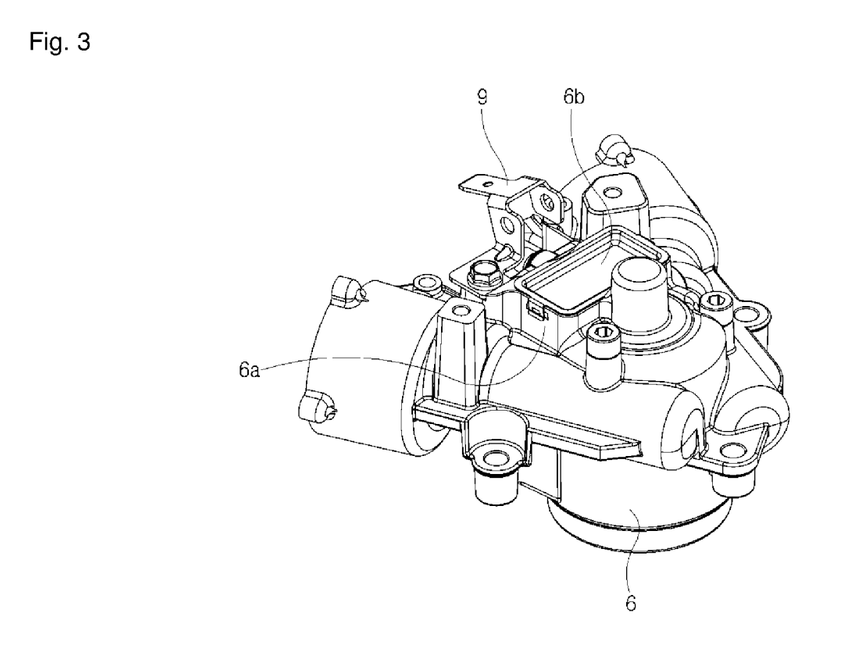
FIG. 3 is a perspective view illustrating a housing as one component of the conventional gear actuator.

FIG. 1 is a back view illustrating a conventional gear actuator, FIG. 2 is a perspective view illustrating a control shaft assembly as one component of the conventional gear actuator, and FIG. 3 is a perspective view illustrating a housing as one component of the conventional gear actuator.

Referring to FIGS. 1 to 3, the conventional gear actuator for a DCT includes an odd-numbered stage select solenoid 1, an odd-numbered stage shift motor 2, an even-numbered stage select solenoid 3, an even-numbered stage shift motor 4, a control shaft assembly 5 that is mechanically connected to the solenoids and the motors to select and shift the lug of a shift rail, and a housing 6 equipped with the components.

In addition, the solenoids 1 and 3 and the motors 2 and 4 are connected to controllers (not shown) through respective individual wirings 7a, 7b, 8a, and 8b for supply of electric power and transmission of control signals. The solenoid-side wirings 7a and 7b are integrated into one component and the motor-side wirings 8a and 8b are integrated into one component so that the integrated components are respectively connected to the controllers through connectors 7c and 8c.

Accordingly, the associated solenoids and motors are operated by the respective odd and even-numbered stage controllers so that one of odd and even-numbered stage shift lugs is selected and shifted for gear shifting.

Meanwhile, the conventional gear actuator has a problem in that, since all of odd and even-numbered stage select solenoids, shift motors, and controllers are provided as individual parts, it takes a long time to test these parts, an assembly process is complicated, a man-hour for assembly is increased, and an assembly quality is deteriorated.

In addition, since a plurality of wirings 7a, 7b, 8a, and 8b and connectors 7c and 8c are used to connect the select solenoids and the shift motors to the controllers, a connection failure such as a welding defect often occurs in the connection portion between the wirings and the connectors, thereby causing poor transmission of electrical signals (control signals). Hence, there is a problem in that the operating stability of the gear actuator is deteriorated.

In addition, the conventional gear actuator is configured such that the rotational force of the shift motor is transmitted through a reduction gearing to a lead screw to transmit a shift operating force to the control shaft assembly by the nut of the lead screw. In this case, if the gears of the reduction gearing are misaligned, operating noise may be caused and the gear actuator may not operate when low current is supplied thereto. In addition, since the lead screw itself has low operation efficiency, the power consumption of the shift motor is increased, which may lead to a reduction of fuel efficiency.

Meanwhile, the control shaft assembly 5 of the gear actuator has a double shaft structure in which an odd-numbered stage control shaft 5a overlaps with an even-numbered stage control shaft 5b, as illustrated in FIG. 2. Shift finger members 5aa and 5ba are fixed to the upper portions of the respective control shafts 5a and 5b and control finger members 5ab and 5bb are fixed to the lower portions of the respective control shafts 5a and 5b. A pair of select guides 5aa' protrude from one side of the shift finger member 5aa while a shift finger 5aa" protrudes from the other side thereof, and a pair of select guides 5ba' protrude from one side of the shift finger member 5ba while a shift finger 5ba" protrudes from the other side thereof. Since the select guides 5aa' and 5ba' and the shift fingers 5aa" and 5ba" are formed in opposite directions to operate the control shafts 5a and 5b in a select direction (axial direction) and a shift direction (circumferential direction), the select solenoids 1 and 3 and the shift motors 2 and 4 to transmit an operating force to them are separately arranged in opposite directions with respect to the control shaft assembly 5. That is, the odd-numbered stage select solenoid 1 and shift motor 2 are disposed to be separated from each other and the even-numbered stage select solenoid 3 and shift motor 4 are disposed to be separated from each other. For this reason, there is a problem in that the arrangement of the select solenoids and the shift motors is complicated and thus the structure of the wirings is complicated. Reference numerals 5ab and 5bb refer to an odd-numbered stage control finger member and an even-numbered stage control finger member that are fixed to the lower portions of the respective control shafts 5a and 5b, and reference numerals 5ab' and 5bb' refer to control fingers protruding from the control finger members. The control fingers are parts that allow desired gear shifting by finally pushing or pulling the lug of the shift rail by the shift and select operations.

Meanwhile, in the gear actuator, the select solenoids 1 and 3 allow the select guides 5aa' and 5ba' of the respective control shafts to be operated in the select direction (in the vertical direction which is the axial direction in the drawing) through an L-shaped select lever that is hinge-pivoted about the bent portion thereof. The select lever is installed in the housing so as to be pivotable about a hinge shaft. One end of the select lever is connected to the select rod of the select solenoid and the other end of the select lever is inserted between the select guides 5aa' and 5ba'. To assemble this select lever, a rectangular assembly window 6a as an opening is formed in the upper portion of the housing 6, and the assembly window 6a is provided with a top cover 6b to seal the assembly window after the assembly of the select lever. The housing 6 is disadvantageous in that it has a complicated structure since the assembly window 6a is formed and the top cover 6b is installed in the housing 6. Moreover, there is a problem in that, since the mounting surface and bolt holes for a connector bracket 9, which fixes the connectors of the wirings, must be formed in the housing 6, the housing 6 has a more complicated structure and a man-hour for assembly is increased.

In addition, in the conventional gear actuator, a detent mechanism for maintaining a select position is formed in the select solenoid. However, it is necessary to adjust the assembly position of the select solenoid to accurately fix the select position by a cumulative tolerance for assembly of select-related parts in the gear actuator, and thus a shim is used to adjust and fix the assembly position of the select solenoid. Accordingly, since it is necessary to select and assemble a shim having an appropriate thickness during the assembly of the select solenoid in the related art, there is a problem in that the assembly of the gear actuator is more complicated and the time required to assemble the gear actuator is increased.

SUMMARY OF THE INVENTION

An object of the present invention is to provide a gear actuator for a double clutch transmission, capable of resolving issues relating to wiring connection failure and wiring disconnection, of having a more compact structure, and of having improved assembly in virtue of a reduction in the number of parts and assembly processes by modularizing electric devices (select solenoids and shift motors) and a controller to remove wirings.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a gear actuator for a double clutch transmission includes a power module in which a controller is directly connected to an odd-numbered stage select solenoid and shift motor and an even-numbered stage select solenoid and shift motor, a body housing having the power module installed therein, and a control shaft assembly connected to the power module in the body housing to transmit select and shift operating forces by a lug of a shift rail.

The odd-numbered stage select solenoid and shift motor may be disposed in one side of the power module and the even-numbered stage select solenoid and shift motor may be disposed in the other side of the power module with respect to a center of the power module.

The power module may include a power module housing, the power module housing may include a rear controller installation part and a front electric device installation part, the controller may be installed in the controller installation part, the odd and even-numbered stage select solenoids and shift motors may be installed in the electric device installation part, and select rods of the select solenoids and rotary shafts of the shift motors may protrude forward and outward from the electric device installation part.

The controller installation part may be open at a rear surface thereof, the controller installation part may be provided with a cover for covering the open rear surface, the controller may be mounted inside the cover, and a connector having a terminal for transmitting power and a shift lever operation signal to the controller may be formed on one surface of the controller installation part.

The cover may have a plurality of cooling fins formed at a rear surface thereof.

Odd and even-numbered stage select lever mounting parts may protrude forward of the electric device installation part, an odd-numbered stage select lever may be pivotably installed to a side of the odd-numbered stage select lever mounting part, an even-numbered stage select lever may be pivotably installed to a side of the even-numbered stage select lever mounting part, and one end of each of the select levers may be pivotably connected to the select rod of an associated one of the select solenoids.

The controller may include a hall sensor for detecting operation displacements of the select rods of the select solenoids, and an angle sensor for detecting angles of operation of the rotary shafts of the shift motors.

The controller may individually and independently control the odd-numbered stage select solenoid and shift motor and the even-numbered stage select solenoid and shift motor.

Rubber boots may be installed between the select rods of the select solenoids and select rod holes of the electric device installation part.

Sealing rings may be installed between the rotary shafts of the shift motors and rotary shaft holes of the electric device installation part.

Shift modules may be inserted into the body housing to transmit output of rotary shafts of the shift motors to shift finger members mounted to control shafts of the control shaft assembly, thereby rotating the shift finger members.

Each of the shift modules may include a ball screw including a screw spline-connected to the rotary shaft of an associated one of the shift motors, a nut surrounding the screw, and a plurality of balls interposed between the screw and the nut, and bearings respectively provided at both ends of the screw.

The nut may have a guide groove formed in one side thereof, and a guide bolt, an end of which is inserted into the guide groove, may be fixedly inserted into a guide bolt hole passing through the body housing.

The control shaft assembly may have a double shaft structure consisting of an odd-numbered stage control shaft and an even-numbered stage control shaft, a pair of select guides and a shift finger may be formed in and protrude from each of shift finger members fixed at upper portions of the respective control shafts, the odd-numbered stage select guides and shift finger may protrude in a direction in which the odd-numbered stage select solenoid and shift motor are installed, and the even-numbered stage select guides and shift finger may protrude in a direction in which the even-numbered stage select solenoid and shift motor are installed.

Each of the shift finger members may have a detent groove formed thereon, and a detent mechanism having a detent ball seated on the detent groove may be inserted and installed into a detent mechanism hole formed in a portion facing the detent groove in the body hosing.

The odd-numbered stage control shaft may have a detent groove formed in an upper end thereof, in which case a detent mechanism having a detent ball seated on the detent groove is inserted and installed into a detent mechanism hole formed in the body hosing, and the even-numbered stage control shaft may have a detent groove formed in an intermediate portion thereof, in which case a detent mechanism having a detent ball seated on the detent groove is inserted and installed into a detent mechanism hole formed in a support bracket supporting the control shaft assembly.

The detent mechanism may include a cylindrical case, a spring inserted into the case, a ball support member supported by the spring, and a detent ball seated and supported on a concave surface of the ball support member.

The body housing may be formed with a shift module insertion part and a select lever installation part, and an opening may be formed in an inlet of a back surface of the body housing so that the shift module insertion part communicates with the select lever installation part through the opening.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Reference will now be made in detail to various embodiments of the present invention, examples of which are illustrated in the accompanying drawings and described below. The present invention may, however, be embodied in different forms and should not be construed as limited to the embodiments set forth herein. The present invention is intended to cover not only the exemplary embodiments, but also various alternatives, modifications, equivalents, replacements and other embodiments, which may be included within the spirit and scope of the present invention as defined by the appended claims. In the drawings, the thickness of each line or the size of each component may be exaggerated or schematically illustrated for convenience of description and clarity.

In addition, the terms used in the specification are terms defined in consideration of functions in the present invention, and these terms may vary with the intention or practice of a user or an operator. Therefore, these terms should be defined based on the entire content disclosed herein.

Hereinafter, exemplary embodiments of the present invention will be described in detail with reference to the accompanying drawings.

Figure 4:
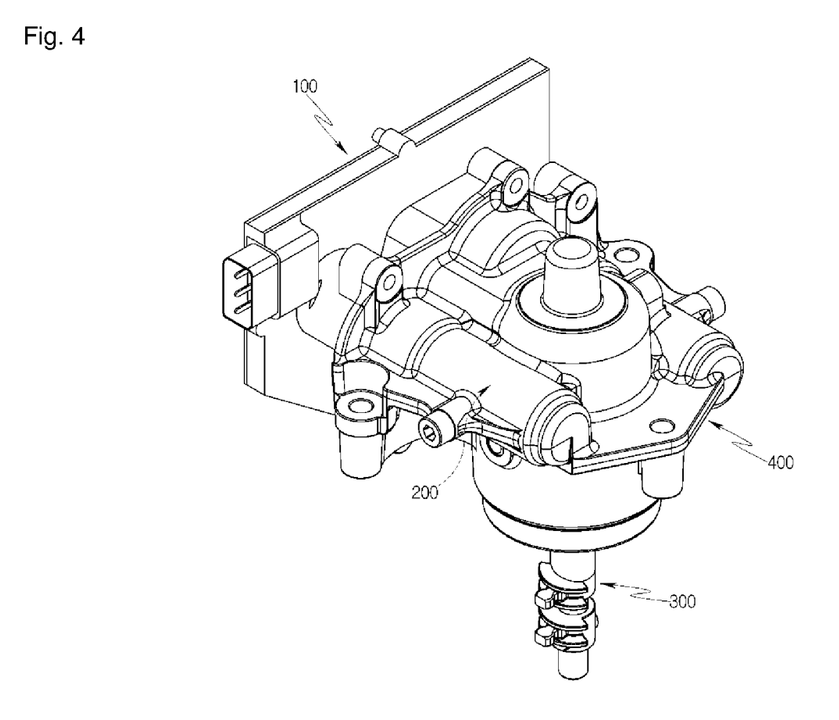
FIG. 4 is a perspective view illustrating a gear actuator according to an embodiment of the present invention.

As illustrated in FIG. 4, a gear actuator for a double clutch transmission according to an embodiment of the present invention includes a power module 100, shift modules 200, a control shaft assembly 300, and a body housing 400.

Figure 5:
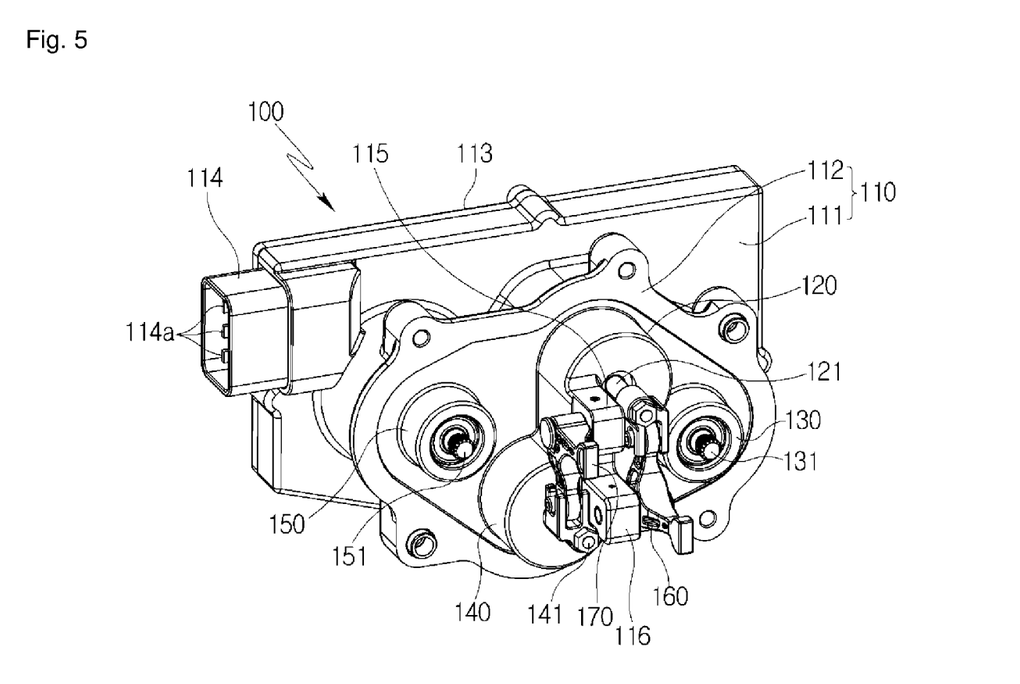
FIG. 5 is a perspective view illustrating a power module as one component of the gear actuator according to the embodiment of the present invention.
Figure 6:
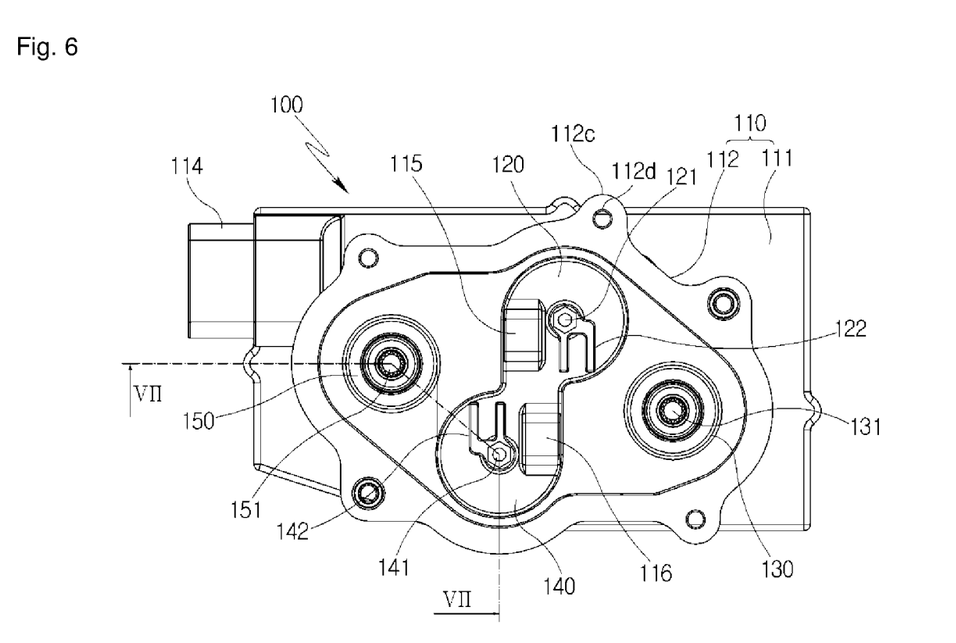
FIG. 6 is a front view illustrating the power module (excluding a select lever)
Figure 7:
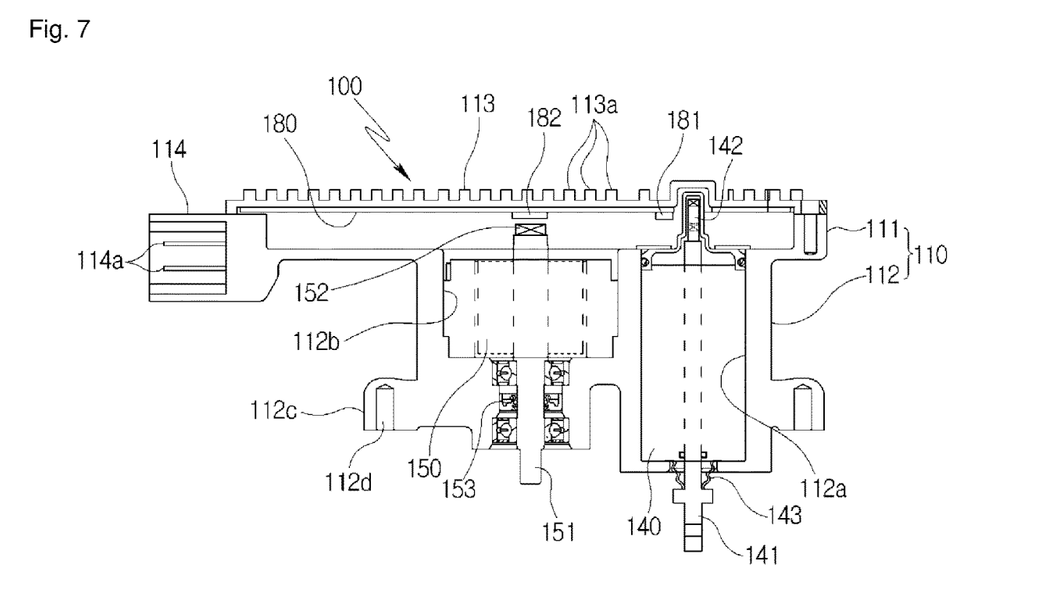
FIG. 7 is a cross-sectional view taken along line VII-VII of FIG. 6.

The power module 100 is an assembly of electric components and a controller, and includes a power module housing 110, an odd-numbered stage select solenoid 120, an odd-numbered stage shift motor 130, an even-numbered stage select solenoid 140, an even-numbered stage shift motor 150, an odd-numbered stage select lever 160, an even-numbered stage select lever 170, and a controller 180, as illustrated in FIGS. 5 to 7. Here, a portion indicated by leader lines of reference numerals 120 to 150 is the power module housing 110 in practice, but associated select solenoids and shift motors are installed therein. Therefore, the installation portions of the select solenoids and shift motors are indicated by leader lines and designated by associated reference numerals.

The power module housing 110 includes a controller installation part 111 having a substantially flat rectangular box shape, and an electric device installation part 112 that protrudes forward from the controller installation part 111.

The controller installation part 111 is open at the back surface thereof, and the select solenoids 120 and 140 and the shift motors 130 and 150 are inserted and installed into the power module housing 110 through the back surface of the controller installation part 111.

The controller installation part 111 has a cover 113, the cover 113 is fixed to the controller installation part 111 by a bolt, and the controller 180 is mounted to the inner surface of the cover 113. The controller 180 is a printed circuit board (PCB) having a variety of devices mounted thereon to supply electric power to the select solenoids 120 and 140 and the shift motors 130 and 150 and control the operation thereof.

The cover 1130 has a plurality of cooling fins 113a formed on the outer surface thereof to easily dissipate heat generated by the controller 180 to the outside.

The controller installation part 111 has a connector 114 formed at one end thereof. The terminal of the connector 114 serves to supply electric power and input a shift lever operation signal and is of course connected to the controller 180.

The electric device installation part 112 protrudes forward from the controller installation part 111, and provides a space therein for insertion and installation of the select solenoids 120 and 140 and the shift motors 130 and 150. That is, the electric device installation part 112 is formed with solenoid insertion holes 112a and motor insertion holes 112b so that the select solenoids 120 and 140 and the shift motors 130 and 150 are inserted into the respective insertion holes. The power input terminals (not shown) of the select solenoids 120 and 140 and the shift motors 130 and 150 are directly connected to the controller 180.

In addition, the controller 180 has a hall sensor 180 that is installed in a portion adjacent to rear ends of select rods 121 and 141 of the select solenoids 120 and 140, and an angle sensor 182 that is installed in a portion adjacent to rear ends of rotary shafts 131 and 151 of the shift motors 130 and 150. For sensing of the hall sensor 180 and the angle sensor 182, sensor magnets 142 and 152 are provided at the rear ends of the select rods 121 and 141 of the select solenoids 120 and 140 and at the rear ends of the rotary shafts 131 and 151 of the shift motors 130 and 150, respectively.

The front ends of the select rods 121 and 141 of the select solenoids 120 and 140 and the rotary shafts 131 and 151 of the shift motors 130 and 150 protrude forward of the electric device installation part 112.

Select lever mounting parts 115 and 116 for installation of the select levers 160 and 170 protrude and are formed at the front center (at the portions equipped with the select solenoids 120 and 140) of the electric device installation part 112.

The even-numbered stage select lever 170 is mounted to the select lever mounting part 115 formed at the portion equipped with the odd-numbered stage select solenoid 120 such that the intermediate portion of the even-numbered stage select lever 170 is pivotable about a pin, and the odd-numbered stage select lever 160 is mounted to the select lever mounting part 116 formed at the portion equipped with the even-numbered stage select solenoid 140 such that the intermediate portion of the odd-numbered stage select lever 160 is pivotable about a pin.

One end of the odd-numbered stage select lever 160 is connected to the select rod 121 of the odd-numbered stage select solenoid 120, and one end of the even-numbered stage select lever 170 is connected to the select rod 141 of the even-numbered stage select solenoid 140.

U-shaped connection brackets 122 and 142 are mounted to the ends of the respective select rods 121 and 141, and one ends of the select rods 160 and 170 are connected to the respective connection brackets 122 and 142 so as to be pivotable about the pins.

The other ends of the select levers 160 and 170 are inserted between select guides 311a and 321a of the control shaft assembly 300 to be described later so as to axially operate them (see FIG. 10).

Bellows-type rubber boots 143 are installed between the select rods 121 and 141 of the select solenoids 120 and 140 and the select rod holes of the electric device installation part 112, through which pass the select rods 121 and 141, to seal the select rod holes.

Sealing rings 153 are installed between the rotary shafts 131 and 151 of the shift motors 130 and 150 and the rotary holes of the electric device installation part 112, through which pass the rotary shafts 131 and 151, to seal the rotary holes.

The electric device installation part 112 has a flange 112c and a bolt hole 112d that are formed in the front edge thereof for coupling with the body housing 400.

Figure 8:
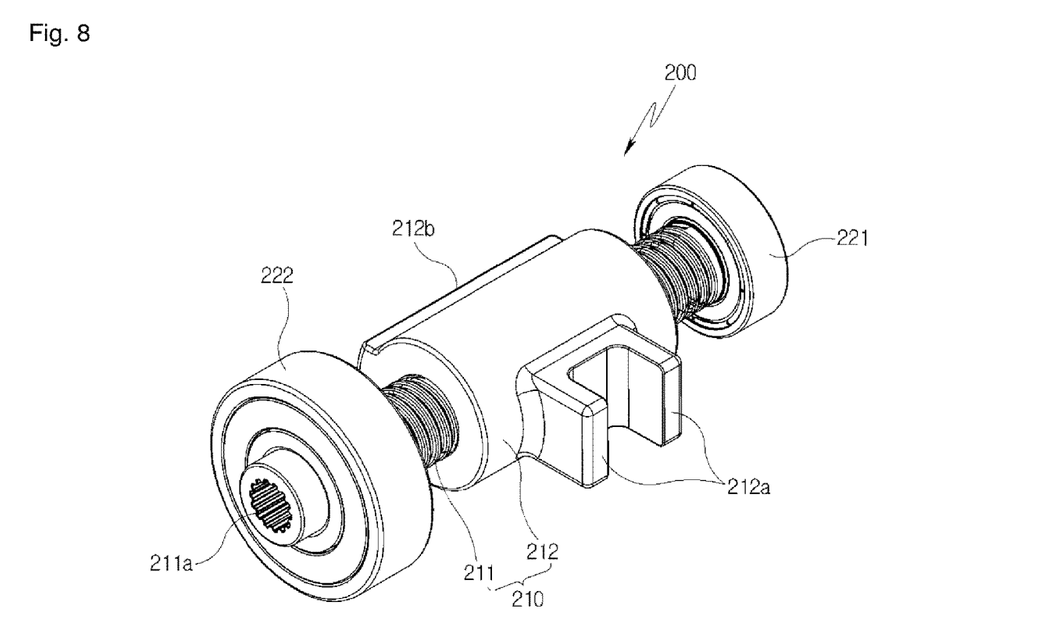
FIG. 8 is a perspective view illustrating a shift module as one component of the gear actuator according to the embodiment of the present invention.
Figure 9:
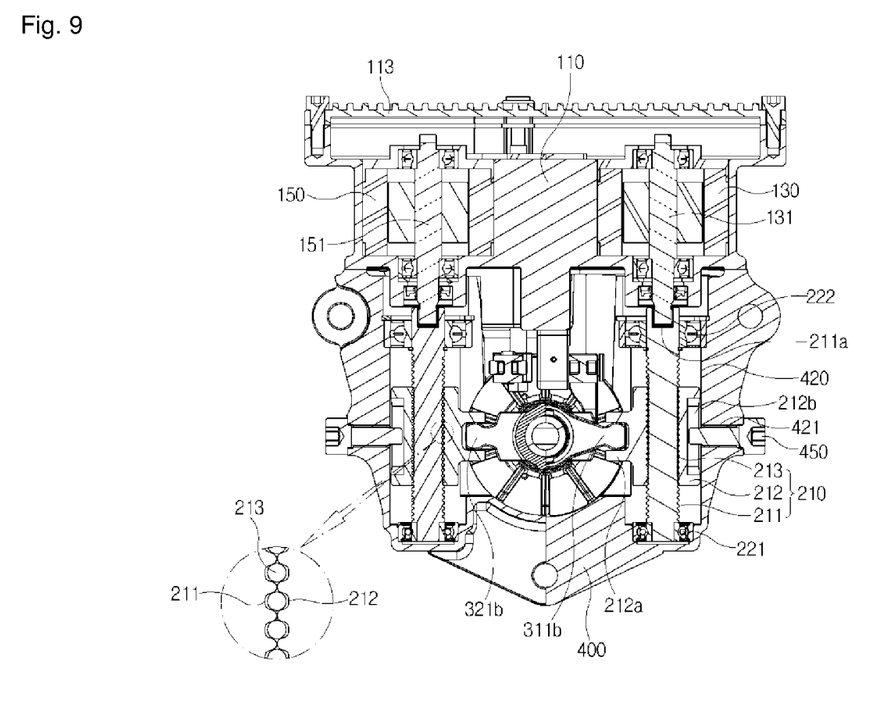
FIG. 9 is a top cross-sectional view illustrating a shift motor and a shift module installation part of the gear actuator according to the embodiment of the present invention.

As illustrated in FIGS. 8 and 9, each of the shift modules 200 includes a ball screw 210 and bearings 221 and 222 that support both ends of the ball screw 210.

The ball screw 210 includes a screw 211, a nut 212 mounted outside the screw 211, and a plurality of balls 213 interposed between the screw 211 and the nut 212. The balls 213 roll along spiral grooves formed in the screw 211 and the nut 212 to reduce friction between the screw 211 and the nut 212.

The screw 211 has a connection groove 211a formed in one end thereof for connection with the rotary shafts 131 and 151 of the shift motors 130 and 150, and a spline is formed on the inner peripheral surface of the connection grove 211a. In response, splines are of course formed on the rotary shafts 131 and 151 of the shift motors 130 and 150.

The bearings 221 and 222 are provided at both ends of the screw 211. The screw 211 is assembled to the bearings 221 and 222 in such a manner that the ends of the screw 211 are inserted into the respective bearings 221 and 222, and they are provided in a module (shift module 200) state in which the screw 211 is assembled to the bearings 221 and 222.

A pair of shift guides 212a, which face each other in the movement direction of the nut 212, protrude from one side on the outer peripheral surface of the nut 212, and a rectilinear guide groove 212b is formed opposite the shift guides 212a.

The shift module 200 having such a structure is inserted and installed into each of shift module insertion parts 420 formed at both sides of the body housing 400. The shift module insertion part 420 is a cylindrical space for insertion of the shift module 200.

When the shift module 200 is inserted into the shift module insertion part 420 of the body housing 400, the bearings 221 and 222 are seated to the inner peripheral surface of the shift module insertion part 420 so that the shift module 200 is stably supported. In this case, shift fingers 311b and 321b of the control shaft assembly 300 are inserted between the shift guides 212a of the nut 212, the end of a guide bolt 450 installed to the body housing 400 is inserted into the guide groove 212b. The guide bolt 450 is a reamer bolt, and is fixedly inserted into a guide bolt hole 421 passing through the shift module insertion part 420 of the body housing 400 (see FIG. 13).

The shift module 200 is used in common for odd and even-numbered stages. However, during assembly of these shift modules 200, only nuts 212 are assembled in opposite directions for connection with the associated shift fingers 311b and 321b.

Meanwhile, FIG. 7 differs from FIG. 9 in a bearing installation structure that supports the rotary shafts 131 and 151 of the shift motors 130 and 150. Both of two bearings support the front portion of the rotary shaft 151 in FIG. 7, whereas one bearing is installed at each of both ends of the rotary shaft 151 in FIG. 9. The bearings for supporting the rotary shafts of the shift motors may be properly disposed as described above.

Figure 10:
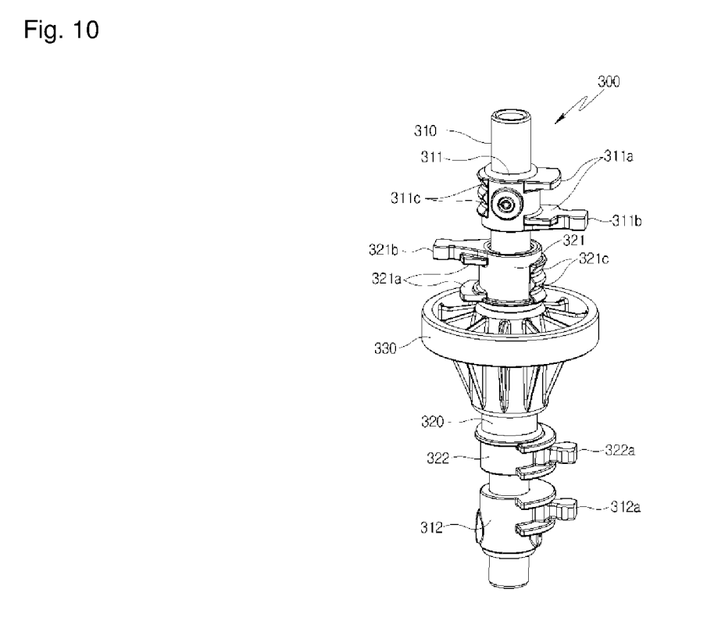
FIG. 10 is a perspective view illustrating a control shaft assembly as one component of the gear actuator according to the embodiment of the present invention.

As illustrated in FIG. 10, the control shaft assembly 300 has a double tube structure consisting of an odd-numbered stage control shaft 310 and an even-numbered stage control shaft 320 into which the odd-numbered stage control shaft 310 is inserted. The inside odd-numbered stage control shaft 310 has a longer length than the outside even-numbered stage control shaft 320, and both ends of the odd-numbered stage control shaft 310 protrudes from both ends of the even-numbered stage control shaft 320. Shift finger members 311 and 321 are mounted to one ends (upper portions in the drawing) of the respective control shafts 310 and 320, and control finger members 312 and 322 are mounted to the other ends (lower portions in the drawing) thereof.

The respective shift finger members 311 and 321 have a pair of select guides 311a and a pair of select guides 321a that protrude from the upper and lower ends on the outer peripheral surfaces thereof while facing each other. The ends of the select levers 160 and 170 are inserted between the select guides 311a and 321a.

The shift fingers 311b and 321b protrude radially from the outer peripheral surfaces of one sides of the respective paired select guides 311a and 321a, and the shift fingers 311b and 321b are inserted between the shift guides 212a formed on the nut 212 of the associated shift module 200 as described above.

Two detent grooves 311c and two detent grooves 321c are formed on the outer peripheral surfaces of the shift finger members 311 and 321 and opposite the select guides 311a and 321a, the detent grooves 311c and 321c are spaced apart from each other in an axial direction (in a select operation direction which is a vertical direction in the drawing) by a predetermined distance.

The control finger members 312 and 322 have control fingers 312a and 322a that protrude radially therefrom. The control fingers 312a and 322a are inserted into the lug groove of a shift lug provided at one end of a shift rail.

A support bracket 330 surrounds the intermediate portion of the even-numbered stage control shaft 320 and has a substantially conical shape. The support bracket 330 is fixedly inserted into the body housing 400 to support the control shaft assembly 300 with respect to the body housing 400.

Figure 11:
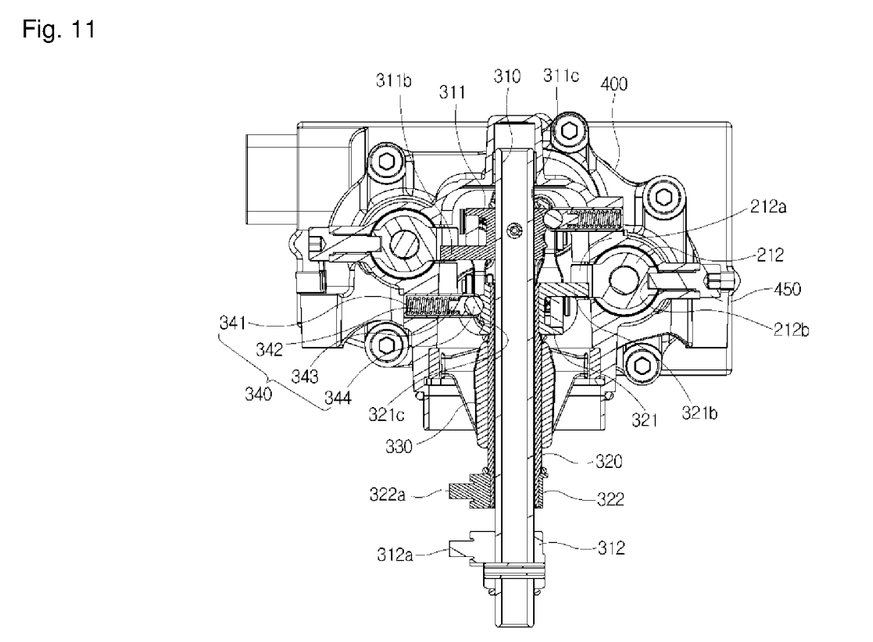
FIG. 11 is a cross-sectional view illustrating an example of a select detent structure according to the embodiment of the present invention.

As illustrated in FIG. 11, detent mechanisms 340 are installed in the body housing 400 so as to correspond to the detent grooves 311c and 321c of the shift finger members 311 and 321. Each of the detent mechanisms 340 includes a cylindrical case 341 that is fixedly inserted into the detent mechanism hole of the body housing 400, a spring 342 that is inserted into the case 341, a ball support member 343 that is supported by the spring 342, and a detent ball 344 that is supported by the ball support member 343. The detent ball 344 is partially exposed to the outside of the case 341, and the end edge of the case 341 is bent inward such that the detent ball 344 is not removed outward from the case 341. The spring 342 is in a slightly compressed state such that the detent ball 344 is always pushed outward of the case 341, and the ball support member 343 has a domed concave shape at one surface thereof to stably support the detent ball 344. In an assembly state, the detent ball 344 is inserted into each of the detent grooves 311c and 321c of the shift finger members 311 and 321 according to the positions of the control shafts 310 and 320.

Figure 12:
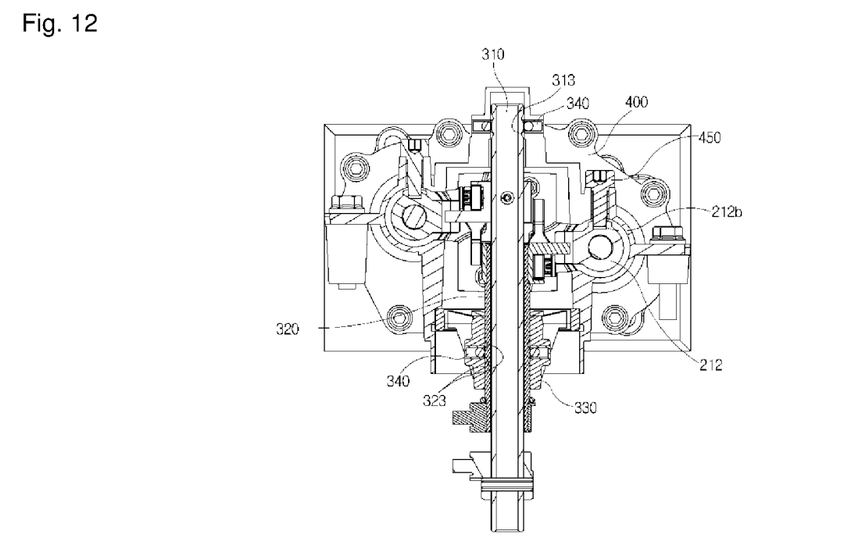
FIG. 12 is a cross-sectional view illustrating another example of a select detent structure according to the embodiment of the present invention.

Meanwhile, the detent structure may be changed as in FIG. 12. In this example, detent grooves 313 and 323 are formed on the outer peripheral surface of the upper end of the odd-numbered stage control shaft 310 and on the outer peripheral surface of the intermediate end of the even-numbered stage control shaft 320.

A detent mechanism 340 acting on the detent groove 313 of the odd-numbered stage control shaft 310 is inserted into the detent mechanism hole formed corresponding to the detent groove 313 of the body housing 400, and a detent mechanism 340 acting on the detent groove 323 of the even-numbered stage control shaft 320 is inserted into the detent mechanism hole formed in the support bracket 330 surrounding the intermediate portion of the even-numbered stage control shaft 320.

Meanwhile, FIG. 12 differs from FIG. 11 in that a guide groove 212b is formed in the nut 212 of the ball screw 210 and a guide bolt 450 is installed corresponding to the same. That is, the guide groove 212b is not formed opposite the shift guide 212a, but may be formed at a position corresponding to an angle difference of 90°. As such, the formation position of the guide groove 212b and the installation position of the guide bolt 450 may be properly changed.

Figure 13:
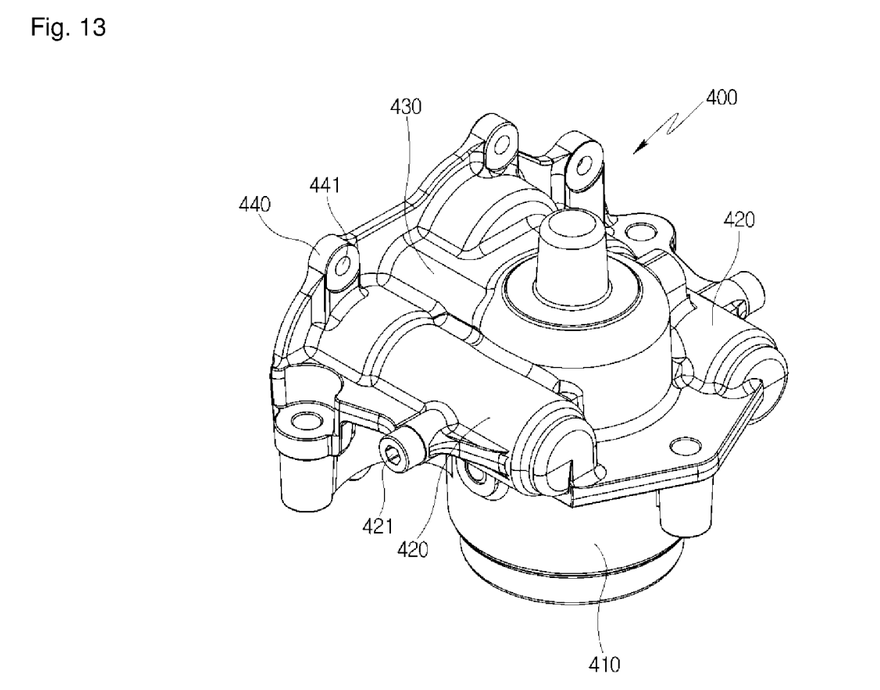
FIG. 13 is a perspective view illustrating a housing of the gear actuator according to the embodiment of the present invention.

As illustrated in FIG. 13, the body housing 400 includes a control shaft assembly insertion part 410 that is open downward and has a substantially cylindrical shape, shift module insertion parts 420 that are formed at both sides of the upper portion of the control shaft assembly insertion part 410, and a select lever installation part 430 that is formed between the shift module insertion parts 420. The insertions parts 410 and 420 and the installation part 430 communicate with one another in the body housing 400, and the shift module insertion parts 420 and the select lever installation part 430 are open rearward.

Each of the shift module insertion parts 420 has a guide bolt hole 421 formed in the side thereof for insertion and fixing of the guide bolt 450.

The shift module insertion part 420 and the select lever installation part have a flange 440 and a bolt hole 441 that are formed in the rear ends thereof and correspond to the flange 112c and the bolt hole 112d of the electric device installation part 112, so that the power module housing 100 may be bolted to the body housing 400.

Figure 14:
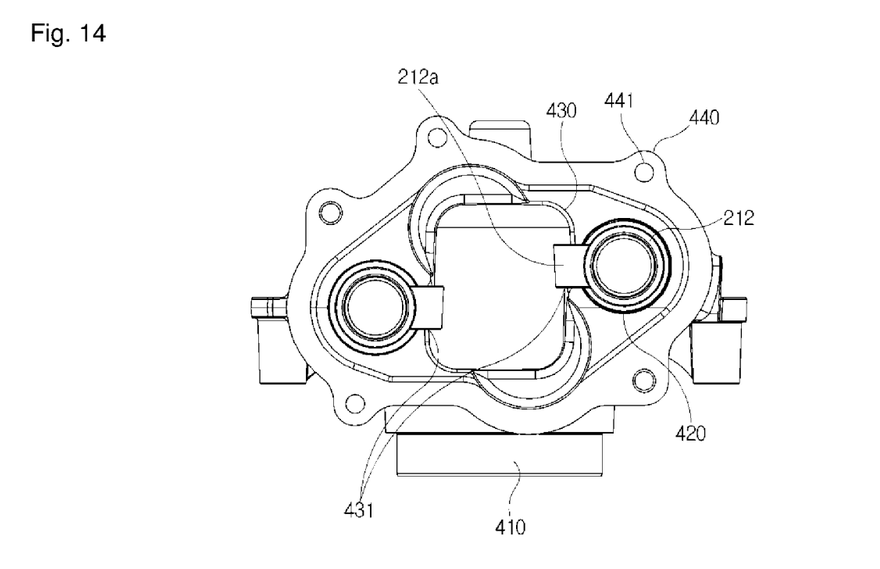
FIG. 14 is a back view illustrating the housing.

As illustrated in FIG. 14, the body housing 400 has an opening 431 through which the shift module insertion part 420 communicates with the select lever installation part 430. In more detail, when the shift module 200 is inserted into the shift module insertion part 420, the opening 431 is formed in a portion of the select lever installation part 430 on the seating surface of the rear bearing 222. When the shift module 200 is inserted into the shift module insertion part 420, the shift guide 212a of the nut 212 enters through the opening 431.

The operation of the gear actuator for a double clutch transmission having the above-mentioned configuration according to the embodiment of the present invention is as follows.

The select rods 121 and 141 move forward or rearward when the select solenoids 120 and 140 are operated, the select levers 160 and 170 are clockwise or counterclockwise rotated about the center axes thereof, one ends of the select levers 160 and 170 push the select guides 311a and 321 in an upward or downward direction so that the control shafts 310 and 320 move upward or downward together with the shift finger members 311 and 321, and the control finger members 312 and 322 move upward or downward so that the control fingers 312a and 322a are located at the groove of one of the lugs of the shift rail (select).

Next, the screw 211 of the shift module 200, which is spline-connected to the rotary shaft 131 or 151, rotates in a forward or reverse direction when the shift motor 130 or 150 is operated, the nut 212 moves forward or rearward along the screw 211.

Accordingly, the shift finger 311b or 321b inserted into the shift guide 212a of the nut 212 is operated in a forward/rearward direction to rotate the shift finger member 311 or 321 so that the control shaft 310 or 320 rotates to rotate the control finger member 312 or 322, and the control finger 312a or 322a of the control finger member 312 or 322 pulls or pushes the selected lug so that the shift rail is shifted in a desired direction for gear shifting (the shift fork mounted to the other end of the shift rail operates a synchronizer to synchronize and engage gear trains of a desired shift stage).

Since the end of the guide bolt 450 is inserted into the guide groove 212b of the nut 212 when the shift module 200 is operated, the rotation of the nut 212 is prevented such that the nut 212 may move along a more accurate rectilinear path.

The gear actuator according to the embodiment of the present invention includes the single power module 100 in which the odd-numbered stage select solenoid 120, the odd-numbered stage shift motor 130, the even-numbered stage select solenoid 140, the even-numbered stage shift motor 150, the controller 180, the odd-numbered stage select lever 160, and the even-numbered stage select lever 170 are installed in the power module housing 100.

In addition, the shift module 200 is configured in such a manner that the bearings 212 and 222 are previously mounted to both ends of the ball screw 210, the odd-numbered stage control shaft 310 and the even-numbered stage control shaft 320 are assembled to constitute the control shaft assembly 300, and the power module 100, the shift module 200, and the control shaft assembly 300 are assembled to the body housing 400.

As such, a large number of individual components are not separately provided, but are provided in a modularized state for each function. Therefore, it is possible to significantly shorten the time required to test these components, to simply an assembly process, to reduce a man-hour for assembly, and to improve an assembly quality. In particular, the select levers 160 and 170 are inserted and installed through the small assembly window formed in the upper portion of the body housing in the related art. Hence, it is difficult to assemble these components and it takes a long time to assemble these components. However, these components are assembled in advance to the power module 100 and are then provided in the present invention, and therefore the gear actuator can be very simply and rapidly assembled.

In addition, since the odd and even-numbered stage electric components, i.e. the odd and even-numbered stage select solenoids 120 and 140 and shift motors 130 and 150 are not separately disposed, but are disposed in the same region (in the left and right portion with respect to the power module housing 110), the gear actuator has a more simple structure.

In addition, the select solenoids 120 and 140 and the shift motors 130 and 150 are directly mounted to the controller 180 without using wirings and connectors. Accordingly, the wirings and the connectors, which are connected to the select solenoids 120 and 140 and the shift motors 130 and 150, may be removed. Consequently, it is possible to resolve issues relating to wiring connection failure and wiring disconnection, and to reduce manufacturing costs in virtue of a reduction in the number of parts.

In addition, the gear actuator has a more compact structure for the same reason, and an assembly process is reduced.

In addition, since the wirings and the connectors are not used, failure does not occur in these portions. Therefore, the transmission of power and electrical signals is improved, with the consequence that the gear actuator can be more stably operated.

The electric components, i.e. the select solenoids 120 and 140 and the shift motors 130 and 150 are perfectly built in the electric device installation part 112 of the power module housing 110, except for the select rods 121 and 141 and the rotary shaft 131 and 151, to be blocked from the outside. Therefore, it is possible to reduce noise since operating noise is not transferred to the outside.

In addition, since the rubber boots 143 are installed between the select rods 121 and 141 and the select rod holes of the select solenoids 120 and 140, the flow of air through the select rod holes is prevented while the operation of the select rods 121 and 141 is not disturbed, thereby preventing air from leaking through the connector 114 of the power module housing 110. Similarly, since the sealing rings 153 are provided between the rotary shafts 131 and 151 and the rotary shaft holes of the shift motors 130 and 150, the flow of air through the rotary shaft holes is prevented while the operation of the rotary shafts 131 and 151 is not disturbed, thereby preventing air from leaking through the connector 114 of the power module housing 110.

The controller 180 is provided with the hall sensor 181 that measures the operation displacements of the select rods 121 and 141 of the select solenoids 120 and 140, and the angle sensor 182 that measures angles of rotation of the rotary shafts 131 and 151 of the shift motors 130 and 150. Accordingly, the controller 180 may recognize the operation states of the select solenoids 120 and 140 and the shift motors, and may perform control thereof.

In addition, the controller 180 operates the odd-numbered stage select solenoid 120 and shift motor 130 and the even-numbered stage select solenoid 140 and shift motor 150, independently. One controller 180 independently consists of an odd-numbered stage controller and an even-numbered stage controller, or the odd-numbered stage controller and the even-numbered stage controller may be separately manufactured as an independent printed circuit board. Accordingly, it is possible to secure a failsafe function by independently operating the odd-numbered stage electric device and the even-numbered stage electric device.

The shift module 200 directly transmits an operating force from the rotary shaft 131 or 151 of the shift motor 130 or 150 through the spline connection portion to the screw 211 of the ball screw 210, without using a reduction gearing. Accordingly, it is possible to basically resolve operating noise caused by the misalignment of the reduction gearing or issues relating to non-operation at low current. In addition, since a power loss does not occur in the reduction gearing, the operation efficiency of the shift module 200 is improved.

In addition, since the ball screw 210 includes the plurality of balls 213 interposed between the screw 211 and the nut 212 to reduce the friction between the screw 211 and the nut 212, a power loss is significantly reduced compared to the conventional lead screw, thereby enabling the operation efficiency of the shift module 200 to be improved.

In addition, since the size of rotational moment occurring in the nut 212 is significantly reduced for the same reason, the rectilinear movement of the nut 212 can be more smoothly performed. Thus, the friction between the guide groove 212b and the guide bolt 450 is reduced, and thus the operation efficiency of the shift module 200 can be further improved together with a reduction in noise and power loss.

The amount of power consumed in the shift motor 130 or 150 is reduced in realizing the same operating force by improving the operation efficiency of the shift module 200, resulting in an improvement in fuel efficiency.

Meanwhile, the screw 211 may be driven with smaller force by decreasing the lead value of the screw 211 and increasing the rotational torque value thereof in the ball screw 210, and therefore the efficiency of the ball screw 210, i.e. the shift module 200 can be improved.

In addition, the shift module 200 is provided in the state in which the bearings 212 and 222 for supporting the rotation of the screw 211 are previously assembled to both ends of the screw 211. Thus, the gear actuator is very simply and rapidly assembled because the shift module 200 is inserted and seated into the shift module insertion part 420 of the body housing 400 in the assembly line of the gear actuator.

In the control shaft assembly 300, all of the select guides 311a and 321a and the shift fingers 311b and 321b of the odd-numbered stage shift finger member 311 and the even-numbered stage shift finger member 321 protrude in the direction in which the associated (odd/even-numbered stage) select solenoid and shift motor are installed. That is, the select guide 311a and the shift finger 311b of the odd-numbered stage shift finger member 311 protrude in the direction in which the odd-numbered stage select solenoid 120 and the odd-numbered stage shift motor 130 are installed in the power module 100, and the select guide 321a and the shift finger 321b of the even-numbered stage shift finger member 321 protrude in the direction in which the even-numbered stage select solenoid 140 and the even-numbered stage shift motor 150 are installed in the power module 100.

Accordingly, the select guides 311a and 321a and the shift fingers 311b and 321b are easily connected to the associated select solenoids 120 and 140 and shift motors 130 and 150, thereby enabling the odd and even-numbered stage select solenoids 120 and 140 and shift motors 130 and 150 to be disposed in respective associated regions in the power module 100.

In addition, the pair of detent grooves 311c or 321c are formed in one side on the outer peripheral surface of the shift finger member 311 or 321, the detent mechanism 340 including the detent ball 344 and the spring 342 is provided in the corresponding portion of the body housing 400. Accordingly, the detent ball 344 is inserted and seated into the detent grooves 311c or 321c so that the select position of the control shaft 310 or 320 is stably maintained.

The detent groove 313 or 323 may be formed in the upper end of the odd-numbered stage control shaft 310 or in the intermediate portion of the even-numbered stage control shaft 320. In this case, the detent mechanism 340 may be installed in the portion of the body housing 400 corresponding to the detent groove 313 or 323 or in the support bracket 330 supporting the control shaft assembly 300.

Since the detent groove is installed in the control shaft assembly 300 (the conventional detent groove and detent ball being installed in the select solenoid), there is no need to install a shim for fixing the positions of the select solenoids 120 and 140 when the select solenoids 120 and 140 are installed to adjust the select position in the related art. Accordingly, since the man-hour required to select the thickness of the shim and assemble the shim is reduced, the gear actuator can be more easily assembled.

The support bracket 330 is a plastic-molded product, and is made of a material having high rigidity and high dimensional stability depending on temperature (for instance, Arnite AV2 390XT).

Since the wiring and the connectors for connection of the electric components and the controller 180 are removed, the conventional connector bracket is not used in the body housing 400 according to the present invention. Accordingly, the number of parts and the man-hour are reduced, and the body housing 400 has a simple shape and is easily manufactured since there is no need for the shape of the mounting surface for mounting the connector bracket.

In addition, since the select levers 160 and 170 are previously assembled in the power module housing 110, it is unnecessary to form the assembly window for assembly of the select levers 160 and 170 in the body housing 400 and there is no need for the top cover for covering the assembly window after assembly. Accordingly, the gear actuator can have a more compact structure in virtue of the more simple shape of the body housing 400.

Meanwhile, the opening 431 is formed between the shift module insertion part 420 and the select lever installation part 430 of the body housing 400 for communication therebetween. Therefore, since there is no interference in the shift guide 212a protruding from the nut 212 when the shift module 200 is inserted into the shift module insertion part 420 of the body housing 400, the shift module 200 is more easily assembled.

As is apparent from the above description, in accordance with the present invention, since odd and even-numbered stage select solenoids, shift motors, and select levers, and a controller are modularized as a single power module, it is possible to easily assemble a gear actuator and reduce an assembly process and a man-hour for assembly.

Since the select solenoids and the shift motors are directly connected to the controller, there is no need for wirings and connectors for connection of them. Accordingly, it is possible to reduce the number of parts and an assembly process, and to prevent wiring connection failure and wiring disconnection. Thus, the transmission of electric power and control signals is improved, with the consequence that the gear actuator can be more stably operated.

Since the rotational force of the shift motor is directly transmitted to a ball screw, it is unnecessary to use a reduction gearing. Accordingly, it is possible to resolve issues relating to operating noise due to gear misalignment of the reduction gearing and non-operation at low current.

Since the friction loss of a shift module is reduced by means of using the ball screw instead of the reducing gearing, the operation efficiency of the gear actuator can be improved and the power consumption thereof can be reduced, thereby achieving an improvement in fuel efficiency.

Since shift fingers protrude in the same direction as select guides, the odd-numbered stage select solenoid and shift motor and the even-numbered stage select solenoid and shift motor can be separately disposed in both sides in a power module, thereby enabling the gear actuator to have a more simple and compact structure.

Since a detent groove for maintaining a select position is formed in a control shaft assembly, there is no need to form the detent groove in the select solenoid as in the related art. Accordingly, since it is unnecessary to adjust the installation position of the select solenoid for accurately fixing the select position, there is no need to select and install a shim for correcting the position of the select solenoid. Accordingly, the assembly of the gear actuator can be more simply performed.

Since the odd and even-numbered stage select levers are previously assembled to the power module housing, it is unnecessary to assemble the select levers through the body housing in the assembly line of the gear actuator. Accordingly, it is unnecessary to install an assembly window for assembly of the select levers in the body housing and a top cover for sealing the assembly window, thereby enabling the body housing to have a more simple structure.

As such, the gear actuator can have a more simple and compact structure, and can be easily assembled.

While the present invention has been described with respect to the specific embodiments, it will be apparent to those skilled in the art that various changes and modifications may be made without departing from the spirit and scope of the invention as defined in the following claims.

What is claimed is:

1. A gear actuator for a double clutch transmission, comprising:
   a power module in which a controller is directly connected to an odd-numbered stage select solenoid, an odd-numbered stage shift motor, an even-numbered stage select solenoid and an even-numbered stage shift motor;
   a body housing having the power module installed therein; and
   a control shaft assembly connected to the power module in the body housing to transmit select and shift operating forces,
   wherein the odd-numbered stage elect solenoid and the odd-numbered stage shift motor are disposed in one side of the power module and the even-numbered stage select solenoid and the even-numbered stage shift motor are disposed in an other side of the power module with respect to a center of the power module.

2. The gear actuator according to claim 1, wherein the power module comprises a power module housing, the power module housing comprises a rear controller installation part and a front electric device installation part, the controller is installed in the controller installation part, the odd and even-numbered stage select solenoids and the odd and even-numbered stage shift motors are installed in the electric device installation part, and select rods of the select solenoids and rotary shafts of the shift motors protrude forward and outward from the electric device installation part.

3. The gear actuator according to claim 2, wherein the controller installation part is open at a rear surface thereof, the controller installation part is provided with a cover for covering the open rear surface, the controller is mounted inside the cover, and a connector having a terminal for transmitting power and a shift lever operation signal to the controller is formed on one surface of the controller installation part.

4. The gear actuator according to claim 3, wherein the cover has a plurality of cooling fins formed at a rear surface thereof.

5. The gear actuator according to claim 2, wherein odd and even-numbered stage select lever mounting parts protrude forward of the electric device installation part, an odd-numbered stage select lever is pivotably installed to a side of the odd-numbered stage select lever mounting part, an even-numbered stage select lever is pivotably installed to a side of the even-numbered stage select lever mounting part, and one end of each of the select levers is pivotably connected to the select rod of an associated one of the select solenoids.

6. The gear actuator according to claim 2, wherein the controller comprises a hall sensor for detecting operation displacements of the select rods of the select solenoids, and an angle sensor for detecting angles of operation of the rotary shafts of the shift motors.

7. The gear actuator according to claim 6, wherein the controller individually and independently controls the odd-numbered stage select solenoid and odd-numbered stage shift motor and the even-numbered stage select solenoid and the even-numbered stage shift motor to secure a failsafe function.

8. The gear actuator according to claim 2, wherein rubber boots are installed between the select rods of the select solenoids and select rod holes of the electric device installation part.

9. The gear actuator according to claim 2, wherein sealing rings are installed between the rotary shafts of the shift motors and rotary shaft holes of the electric device installation part.

10. The gear actuator according to claim 1, wherein shift modules are inserted into the body housing to transmit output of rotary shafts of the shift motors to shift finger members mounted to control shafts of the control shaft assembly, thereby rotating the shift finger members.

11. The gear actuator according to claim 10, wherein each of the shift modules comprises a ball screw comprising a screw spline-connected to the rotary shaft of an associated one of the shift motors, a nut surrounding the screw, and a plurality of balls interposed between the screw and the nut, and bearings respectively provided at both ends of the screw.

12. The gear actuator according to claim 11, wherein the nut has a guide groove formed in one side thereof, and a guide bolt, an end of which is inserted into the guide groove, is fixedly inserted into a guide bolt hole passing through the body housing.

13. The gear actuator according to claim 1, wherein the control shaft assembly has a double shaft structure consisting of an odd-numbered stage control shaft and an even-numbered stage control shaft, a pair of select guides and a shift finger are formed in and protrudes from each of shift finger members fixed at upper portions of the respective control shafts, the odd-numbered stage select guides and shift finger protrude in a direction in which the odd-numbered stage select solenoid and the odd-numbered stage shift motor are installed, and the even-numbered stage select guides and shift finger protrude in a direction in which the even-numbered stage select solenoid and the even-numbered stage shift motor are installed.

14. The gear actuator according to claim 13, wherein each of the shift finger members has a detent groove formed thereon, and a detent mechanism having a detent ball seated on the detent groove is inserted and installed into a detent mechanism hole formed in a portion facing the detent groove in the body hosing.

15. The gear actuator according to claim 13, wherein the odd-numbered stage control shaft has a detent groove formed in an upper end thereof, in which case a detent mechanism having a detent ball seated on the detent groove is inserted and installed into a detent mechanism hole formed in the body hosing, and the even-numbered stage control shaft has a detent groove formed in an intermediate portion thereof, in which case a detent mechanism having a detent ball seated on the detent groove is inserted and installed into a detent mechanism hole formed in a support bracket supporting the control shaft assembly.

16. The gear actuator according to claim 14, wherein the detent mechanism comprises a cylindrical case, a spring inserted into the case, a ball support member supported by the spring, and a detent ball seated and supported on a concave surface of the ball support member.

17. The gear actuator according to claim 10, wherein the body housing is formed with a shift module insertion part and a select lever installation part, and an opening is formed in an inlet of a back surface of the body housing so that the shift module insertion part communicates with the select lever installation part through the opening.

18. The gear actuator according to claim 15, wherein the detent mechanism comprises a cylindrical case, a spring inserted into the case, a ball support member supported by the spring, and a detent ball seated and supported on a concave surface of the ball support member.

* * * * *